(12) United States Patent
Suzuki

(10) Patent No.: US 6,890,464 B2
(45) Date of Patent: May 10, 2005

(54) METHOD OF MANUFACTURING WATERPROOF WIRE HARNESS

(75) Inventor: Hiroshi Suzuki, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/187,442

(22) Filed: Jul. 2, 2002

(65) Prior Publication Data

US 2003/0006523 A1 Jan. 9, 2003

(30) Foreign Application Priority Data

Jul. 3, 2001 (JP) ................................. P2001-202528

(51) Int. Cl.$^7$ ................ B29C 39/10; B29C 65/70
(52) U.S. Cl. ............... 264/134; 264/254; 264/263; 264/265; 264/275; 264/279; 264/319
(58) Field of Search ................ 264/134, 135, 264/248, 249, 250, 254, 263, 265, 271.1, 275, 279, 279.1, 319; 156/48, 51, 86; 174/50, 50.5, 50.51

(56) References Cited

U.S. PATENT DOCUMENTS

| | | | | |
|---|---|---|---|---|
| 3,255,280 A | * | 6/1966 | Burrowes | 264/1.28 |
| 3,800,522 A | * | 4/1974 | Hughes et al. | 57/215 |
| 4,473,716 A | * | 9/1984 | Jesseman | 174/117 F |
| 4,555,284 A | * | 11/1985 | Quella et al. | 156/79 |
| 4,797,513 A | * | 1/1989 | Ono et al. | 174/153 G |
| 4,923,537 A | * | 5/1990 | Matsushima | 156/48 |
| 4,934,100 A | * | 6/1990 | Adell | 49/462 |
| 5,035,766 A | * | 7/1991 | More et al. | 156/581 |
| 5,732,457 A | * | 3/1998 | Ishiwata et al. | 29/564.7 |
| 5,737,457 A | * | 4/1998 | Saini et al. | 385/12 |
| 6,027,679 A | * | 2/2000 | O'Brien et al. | 264/272.14 |
| 6,069,319 A | * | 5/2000 | Davis et al. | 174/72 A |
| 6,071,446 A | * | 6/2000 | O'Brien et al. | 264/46.5 |
| 6,482,340 B1 | * | 11/2002 | Davis et al. | 264/46.4 |
| 6,483,340 B2 | * | 11/2002 | Uenishi | 326/27 |

FOREIGN PATENT DOCUMENTS

| | | |
|---|---|---|
| DE | 3431617 C2 | 5/1988 |
| DE | 39 03 059 A1 | 8/1990 |
| DE | 40 13 785 A1 | 10/1991 |
| DE | 43 21 044 A1 | 1/1995 |
| DE | 195 14 476 A1 | 10/1996 |
| DE | 196 40 816 C2 | 10/2001 |
| EP | 1 038 344 B1 | 9/2002 |
| JP | 10-135657 | 5/1998 |
| JP | 11-238416 | 8/1999 |

OTHER PUBLICATIONS

Patent Abstracts of Japan, Publication No. 10135657 A; May 22, 1998; Sumitomo Wiring Syst Ltd.

* cited by examiner

*Primary Examiner*—Angela Ortiz
(74) *Attorney, Agent, or Firm*—Sughrue Mion, PLLC

(57) ABSTRACT

A coating position at which an water sealing agent in an unsolidified condition is coated on an outer periphery of each wire is provided. A first mold formed with a groove and a second mold configured to be inserted into the groove are provided. The second mold has a molding face which defines a space between a bottom portion of the groove. The space has a cross section which is identical with a cross sectional shape of a through hole of a grommet through which the wires are inserted. The wires are conveyed one by one so as to pass through the coating position while coating the outer periphery of each wire with the water sealing agent. The wires coated with the water sealing agent are thrown into the groove of the first mold. The second mold is inserted into the groove to press the wires in the groove such that the unsolidified water sealing agent fills interstices of adjacent wires while solidifying the water sealing agent. The second mold is released from the first mold after the water sealing agent is solidified.

5 Claims, 7 Drawing Sheets

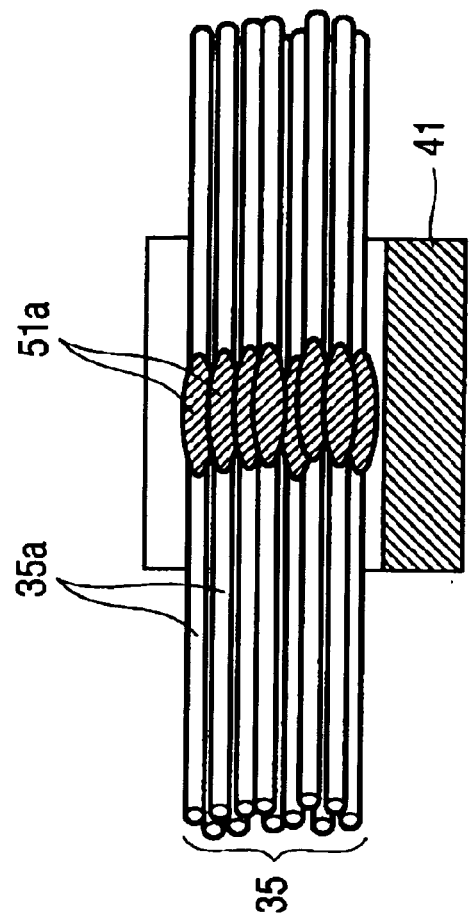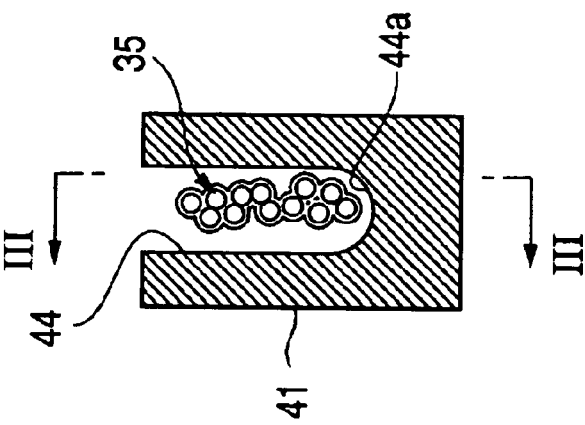

FIG.6A PRIOR ART
FIG.6B PRIOR ART
FIG.6C PRIOR ART
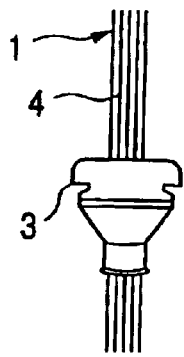
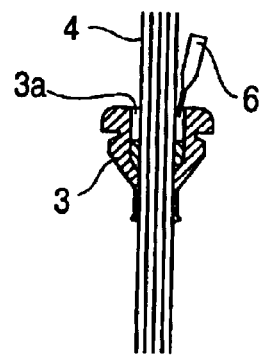
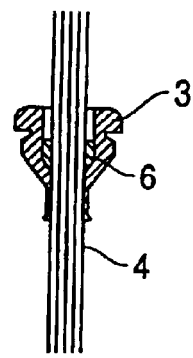
FIG.7 PRIOR ART
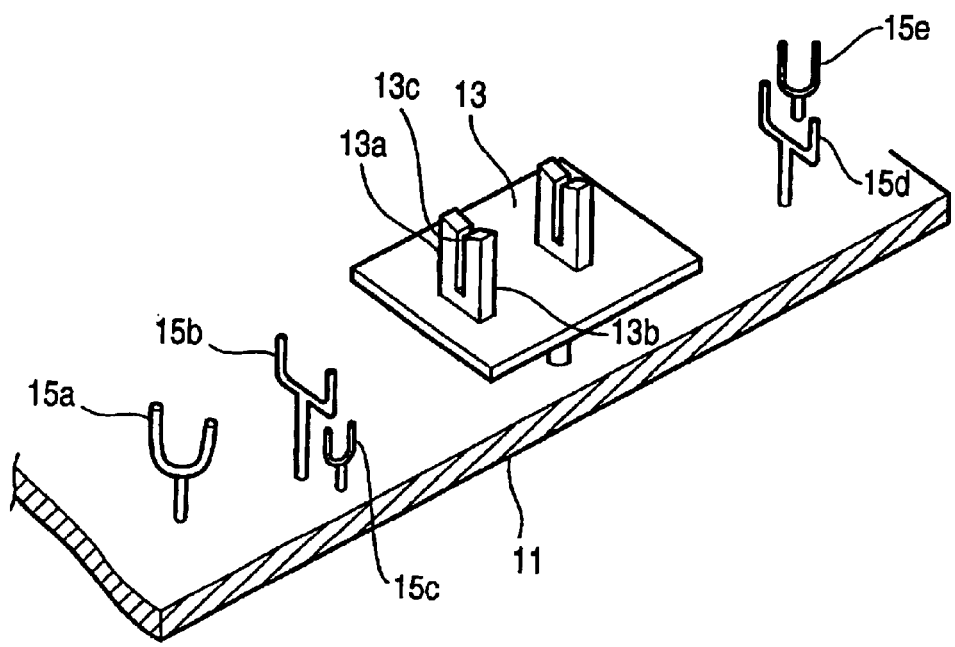

METHOD OF MANUFACTURING WATERPROOF WIRE HARNESS

BACKGROUND OF THE INVENTION

This invention relates to a method of manufacturing a waterproof wire harness in which a grommet-passing portion of a wire bundle for passing through a grommet, adapted to be mounted in a through hole in a body panel of a vehicle, is tied into a waterproof structure in which a gap between any adjacent wires is closed by a water sealing agent.

FIG. 6 shows a first related-art method of manufacturing a waterproof wire harness.

The wire harness 1, shown here, is used in the electric wiring for a vehicle, and when a group of wires are shaped into a form to be wired on the vehicle, a waterproofing treatment is applied to those portions of the wires which are to be passed through a grommet 3 adapted to be mounted in a through hole formed in a body panel of a vehicle.

More specifically, first, the grommet 3 is mounted on a predetermined portion of the wire bundle 4 as shown in FIG. 6A, and then a water sealing agent 6 in an unsolidified state is filled in a gap between an inner surface of a harness-passing hole 3a in the grommet 3 and the wire bundle 4 as shown in FIG. 6B, and is allowed to stand for a predetermined time period, so that the water sealing agent is solidified, thereby providing a waterproof structure in which the gap between the wire bundle 4 and the grommet 3 is filled up by the solidified water sealing agent 6, as shown in FIG. 6C.

In such a manufacturing method, however, a very small gap remains between any adjacent wires at the grommet-passing portion of the wire bundle 4, and therefore there is a fear that external rain water intrudes into these gaps because of a capillary phenomenon, which has invited a problem that a sufficient waterproof effect can not be obtained.

Therefore, there has been proposed a second related-art manufacturing method shown in FIGS. 7 through 8F.

The waterproof wire harness-manufacturing method, shown here, is disclosed in Japanese Patent Publication No. 10-135657A, and a waterproofing treatment jig 13 is beforehand mounted on a predetermined portion of a wiring operation board 11 which is used for preforming or shaping a group of wires into a form to be wired on a vehicle.

A plurality of wire group support jigs 15a, 15b, 15c, 15d, 15e, ... for supporting the wire group in a branched pattern, corresponding to the predetermined wiring form, are mounted on the wiring operation board 11.

The waterproofing treatment jig 13 has slits 13c for arranging the wires of the grommet-passing portion in a row, each of the slits being defined by a pair of opposed arms 13a and 13b.

The width of the slit 13c is so determined as to arrange the wires of the grommet-passing portion vertically one upon another in one row.

The waterproof structure of the grommet-passing portion, utilizing the waterproofing treatment jig 13, is formed according to the procedure of FIGS. 8A to 8F.

Namely, first, grommet-passing portions of the group of wires 16 are arranged vertically in a row like a belt by the pair of spaced-apart slits 13, as shown in FIG. 8A. Then, a water sealing agent 19 in an unsolidified state is applied to one surface of that portion of the arranged wire group 16, disposed between the pair of slits 13c, by a coating nozzle 18 as shown in FIG. 8B. Generally, moisture-solidifying silicone RTV is used as the water sealing agent 19. Then, a band-like film 21 for uniting purposes is bonded to the one surface of the wire group 16, coated with the water sealing agent 19, thereby interconnecting the wires of the wire group 16 in such a manner that these wires are kept arranged in one row, and thereafter the waterproofing treatment jig 13 is moved downward, thereby removing the wire group 16 from the waterproofing treatment jig 13, as shown in FIG. 8C.

Then, the band-like film 21 is wound on the wire group 16 to tie this wire group into a wire bundle of a round cross-section, as shown in FIG. 8D. Further, a tape 23 is wound on that portion of the wire bundle, tied by the band-like film 21, thereby forming the wire bundle into such a circular cross-sectional shape and size that the wire bundle can be tightly fitted into a harness-passing hole in a grommet, as shown in FIG. 8E, and the water sealing agent is solidified. Thereafter, the grommet 25 is mounted on that portion of the wire bundle having the tape 23 wound thereon, as shown in FIG. 8E.

In the above manufacturing method, however, in the case where the wire group includes wires of different outer diameters, it has sometimes been difficult to arrange the wires in one row, and besides it has been difficult to coat the water sealing agent onto the wire group.

When the arrangement of the wires and the coating of the water sealing agent are effected satisfactorily, a gap between any adjacent wires at the grommet-passing portion of the wire bundle can be filled up by the water sealing agent. Even in such a case, however, when the group of wires 16 are tied into a bundle by the band-like film 21, the outer diameter of the resulting wire bundle is liable to vary, and in the next step of winding the tape 23, the outer diameter of the wire bundle must be corrected into a size, corresponding to the diameter of the harness-passing hole in the grommet 25, by adjusting the amount of winding of the tape 23. Thus, the operation for adjusting the amount of winding of the tape 23 is required, and therefore there have been encountered problems that much time and labor are required for the operation, and that it is difficult to carry out the operation in an automated manner.

And besides, when the tape 23 is wound spirally, there is a probability that very small gaps are formed in step portions, formed by the overlapping portions of the wound tape 23, thus lowering the waterproof performance.

SUMMARY OF THE INVENTION

It is therefore an object of the invention to provide a method of manufacturing a waterproof wire harness in which the bundle of tied wires can be highly precisely finished into a desired outer diameter without the need for a time-consuming tape-winding operation regardless of whether or not the wire bundle includes the wires of different outer diameters, so that the improved productivity and the enhanced waterproof performance can be achieved.

In order to achieve the above object, according to the present invention, there is provided a method of manufacturing a waterproof wire harness, comprising the steps of:

providing a plurality of wires;

providing a coating position at which an water sealing agent in an unsolidified condition is coated on an outer periphery of each wire;

providing a first mold formed with a groove;

providing a second mold configured to be inserted into the groove, the second mold having a molding face which defines a space between a bottom portion of the groove, the space having a cross section which is identical with a cross sectional shape of a through hole of a grommet through which the wires are inserted;

conveying the wires one by one so as to pass through the coating position while coating the outer periphery of each wire with the water sealing agent;

throwing the wires coated with the water sealing agent into the groove of the first mold;

inserting the second mold into the groove;

pressing the wires in the groove such that the unsolidified water sealing agent fills interstices of adjacent wires while solidifying the water sealing agent; and releasing the second mold from the first mold after the water sealing agent is solidified.

In this method, a grommet-passing portion of the wires can be easily tied into the waterproof structure in which the interstices between the wires are filled up by the water sealing agent, and besides the tied wire bundle can be highly precisely finished into the desired outer diameter without the need for a time-consuming tape-winding operation regardless of whether or not the wire bundle includes the wires of different outer diameters.

Therefore, the manufacturing process can be suitably automated, and the improved productivity and the enhanced waterproof performance can be achieved.

Since a two-pack foamed silicone RTV is used as the water sealing agent, as compared with the related-art method including the time-consuming tape-winding operation, two-pack foamed silicone RTV, which can be completely solidified in a short time, can be used as the water sealing agent, and with the use of such short-time-solidifying water sealing agent, the productivity can be further improved greatly.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3A is a transverse cross-sectional view of the waterproofing treatment jig, showing a step of throwing the wire into a mold in the manufacturing method;

FIG. 3B is a cross-sectional view taken along the line III—III of FIG. 3A;

FIGS. 6A to 6C are views explanatory of the procedure of applying a waterproofing treatment to a grommet-passing portion in a first related-art manufacturing method;

FIG. 7 is a perspective view showing the construction of a waterproofing treatment jig used in a second related-art manufacturing method.

DETAILED DESCRIPTION OF THE PREFERRED EMBODIMENTS

A preferred embodiment of a manufacturing method of a waterproof wire harness according to the present invention will now be described in detail with reference to the accompanying drawings.

Figure 1:
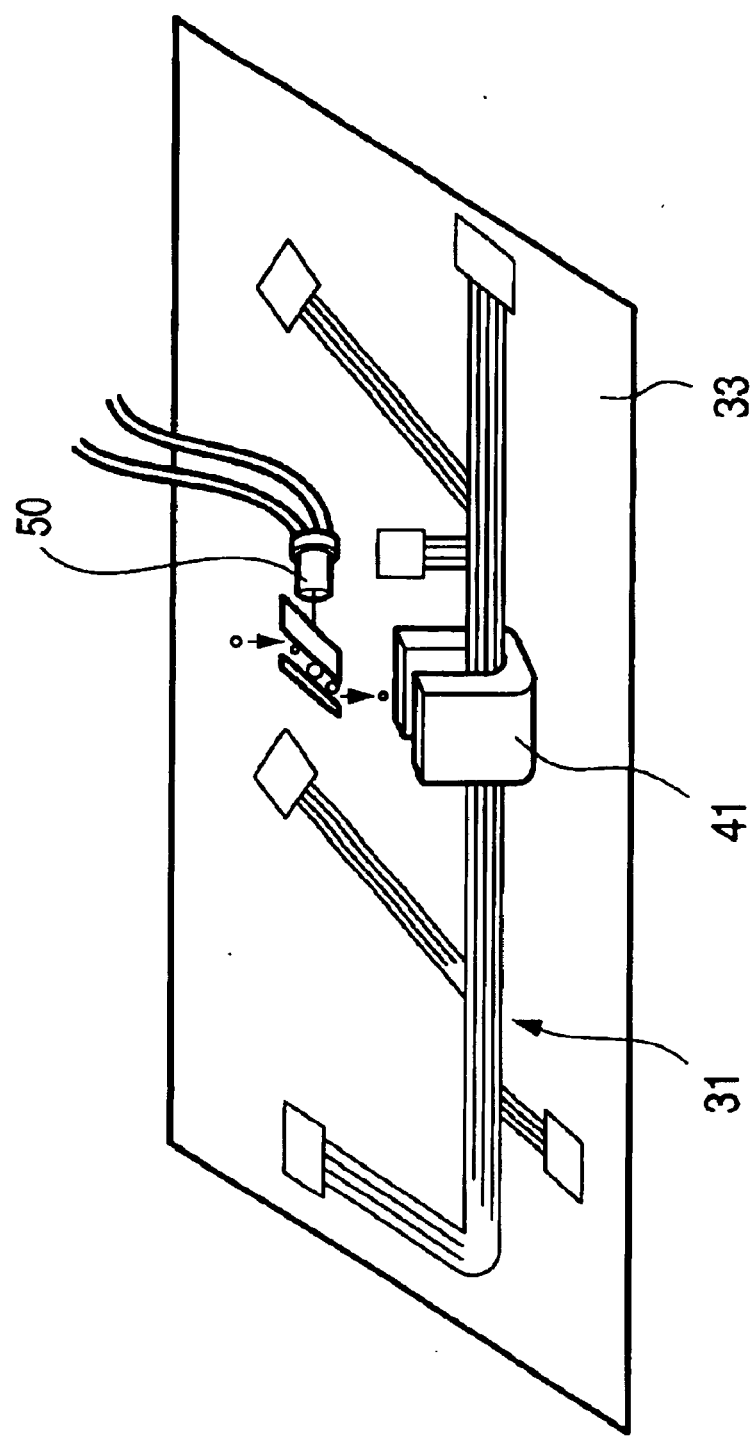
FIG. 1 is a perspective view showing the construction of an apparatus for performing a manufacturing method according to one embodiment of the invention.

A waterproof wire harness 31, produced by the manufacturing method of this embodiment, is used in the electric wiring for a vehicle, and when a group of wires, constituting a wire harness, are shaped in a branched manner into a form to be wired on the vehicle, on a wiring operation board 33 as shown in FIG. 1, those portions of the wires for passing through a grommet, adapted to be mounted in a through hole in a body panel of the vehicle, are tied into a wire bundle of a waterproof structure.

A lower mold 41 and an upper mold 43 (see FIGS. 4A and 4B), associated with this lower mold 41, are provided at that portion of the wiring operation board 33 corresponding to the grommet-passing portion of the wire group, the lower and upper molds 41 and 43 forming the waterproofing treatment jig.

The lower mold 41 has a waterproofing treatment groove 44 for passing the grommet-passing portion of the wire group 35 therethrough, as shown in FIGS. 3A and 3B. The waterproofing treatment groove 44 is a deep groove of a generally channel-shaped cross-section, and a bottom portion 44a of the waterproofing treatment groove 44 is finished into a semi-circular cross-sectional shape corresponding to the contour of a lower portion of a cross-sectionally circular harness-passing hole in the grommet.

Figure 4B:
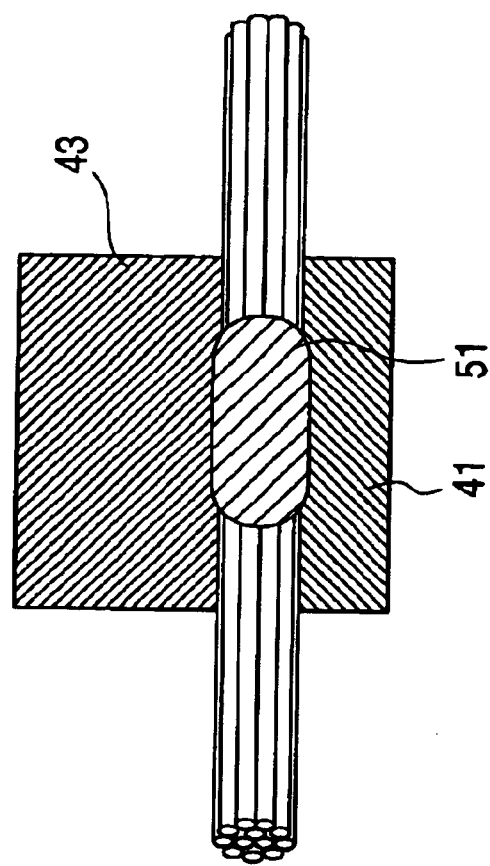
FIG. 4B is a cross-sectional view taken along the line IV—IV of FIG. 4A.
Figure 4A:
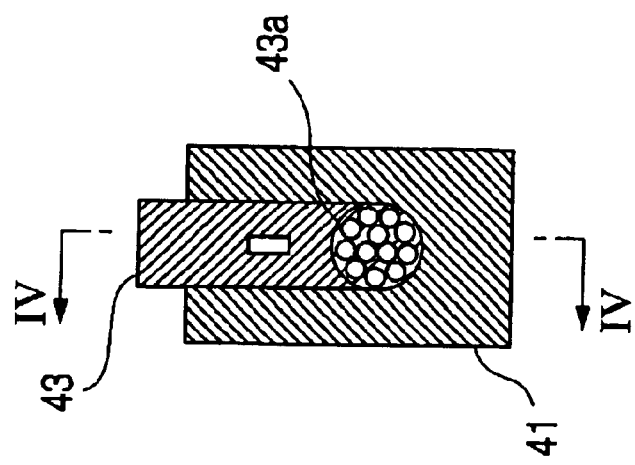
FIG. 4A is a transverse cross-sectional view of the waterproofing treatment jig, showing a step of shaping a wire harness in the manufacturing method.

As shown in FIGS. 4A and 4B, the upper mold 43 is a mold for fitting into the waterproofing treatment groove 44, and its distal end surface is formed into a molding surface 43a for pressing the wire group 35, received in the waterproofing treatment groove 44, opposing to the bottom portion 44a of the waterproofing treatment groove 44. This molding surface 43a cooperates with the bottom portion 44a of the waterproofing treatment groove 44 to form a molding space of a circular cross-section corresponding to the circular cross-section of the harness-passing hole in the grommet.

In this embodiment, the upper mold 43 and the waterproofing treatment groove 44 are made of a fluororesin (fluorine plastics) from which a water sealing agent, coated on the wires, can be easily released.

Next, the procedure of manufacturing the waterproof structure of this embodiment will be described in detail.

Figure 2B:
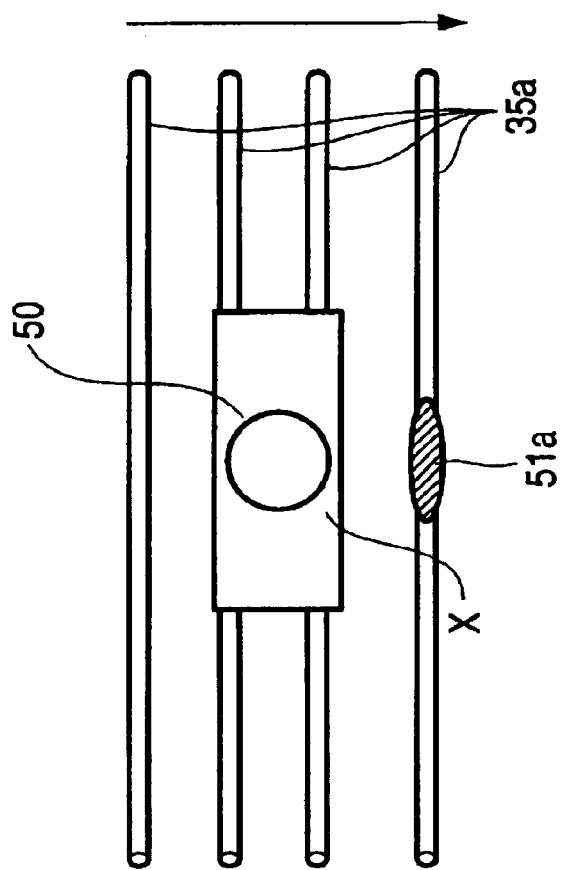
FIG. 2B is a view as seen from a direction of arrow II of FIG. 2A.
Figure 2A:
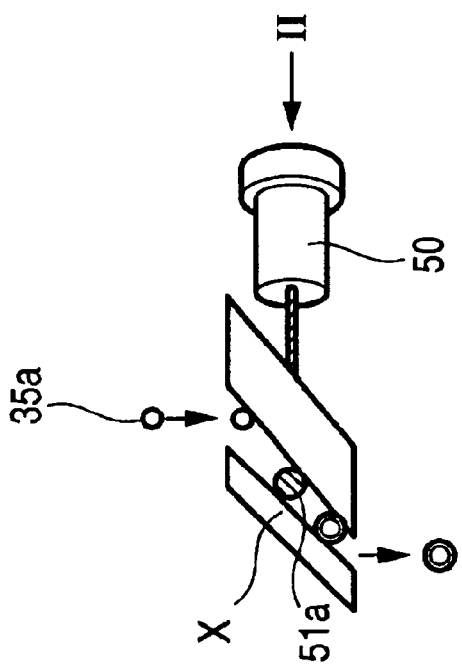
FIG. 2A is a transverse cross-sectional view of a waterproofing treatment jig, showing a step of conveying wires and a step of coating a water sealing agent in the manufacturing method.

First, as shown in FIGS. 2A and 2B, those portions of the wires 35a, forming that portion of the wire group 35 for passing through the grommet, are passed one by one through a coating position X (conveyance step), while a water sealing agent is supplied to the coating position X to coat an unsolidified water sealing agent onto each of the wires, passing through the coating position X, over the entire periphery thereof (coating step).

The coating position X is set midway in a path of conveyance of the wires 35a forming the wire group 35.

In the coating step, a predetermined amount of the unsolidified water sealing agent 51a is caused to drop onto each wire 35a, passing through the coating position X, by the use of a coating nozzle 50. The unsolidified water sealing agent 51a has such viscosity that the dropped water sealing agent 51a can be distributed over the entire periphery of each wire 35a because of its fluidity.

In this embodiment, a two-pack foamed silicone RTV, such as "Toray-Dow Corning Silicone SE1900" (trade name) is used as the water sealing agent.

It takes only a short time of 5 to 10 minutes for this water sealing agent to be solidified, while it takes about 48 hours for commonly-used moisture-solidifying silicone RTV to be solidified, and therefore the time, required for the operation, can be greatly reduced.

Next, the wires 35a, coated with the unsolidified water sealing agent 51a, are thrown sequentially into the waterproofing treatment groove 44 in the lower mold 41 as shown in FIGS. 3A and 3B (throw-in step).

Then, as shown in FIGS. 4A and 4B, the wire group 35, having the interstices filled up by the unsolidified water sealing agent 51a, is pressed by the upper mold 43 fitted in the waterproofing treatment groove 44, and formed into a shape, corresponding to the cross-sectional shape of the harness-passing hole in the grommet. At this time, the water sealing agent 51a is solidified.

Figure 5B:
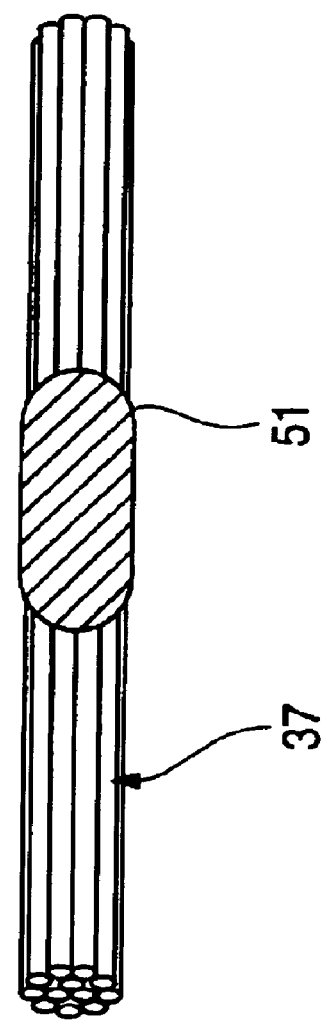
FIG. 5B is a view as seen from a direction of arrow V of FIG. 5A.
Figure 5A:
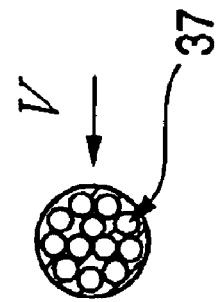
FIG. 5A is a cross-sectional view of a grommet-passing portion of a wire bundle formed by the manufacturing method.
Figure 8A:
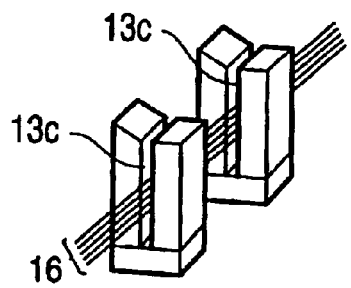
FIGS. 8A through 8F are views explanatory of the procedure of applying a waterproofing treatment to a grommet-passing portion in the second related-art manufacturing method.
Figure 8B:
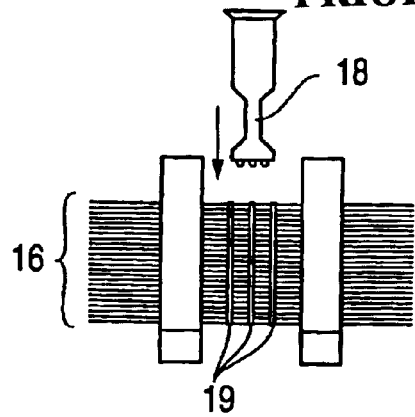
Figure 8C:
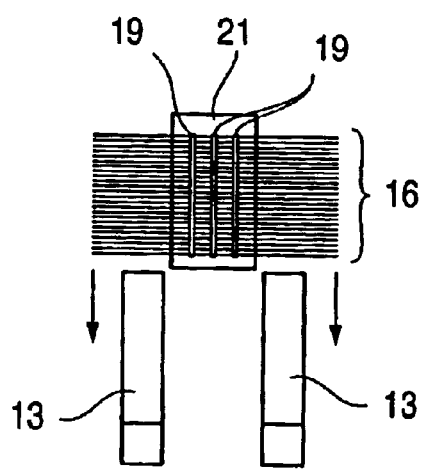
Figure 8D:
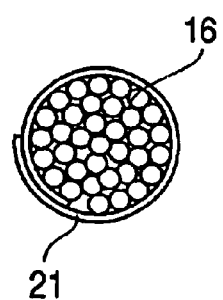
Figure 8E:
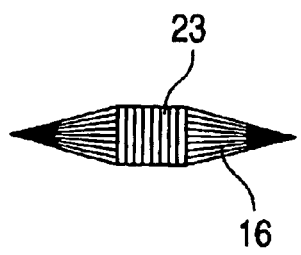
Figure 8F:
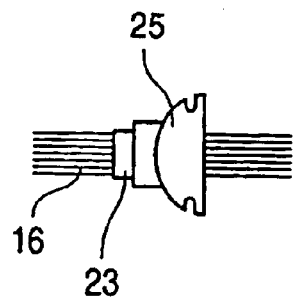

After the solidification of the water sealing agent 51a is finished, the lower mold 41 and the upper mold 43 are moved apart from each other, and a wire bundle 37, tied through the water sealing part 51, is removed from the mold, thus completing the operation, as shown in FIGS. 5A and 5B.

In the above manufacturing method, the grommet-passing portion of the wire group 35, having the unsolidified water sealing agent 51a coated on the outer peripheral surface of each of the wires 35a forming the wire group 35, is pressed and formed into the shape, corresponding to the cross-sectional shape of the harness-passing hole in the grommet, by the waterproofing treatment groove 44 in the lower mold 41 and the upper mold 43 fitted therein, so that the interstices between the wires are filled up by the unsolidified water sealing agent 51a, and at the same time by the press-shaping operation, effected by the upper and lower molds, the wire group is finished into the wire bundle of high precision which has such an outer diameter as to tightly fit in the harness-passing hole in the grommet.

Therefore, the grommet-passing portion of the wire group 35 can be easily tied into the waterproof structure in which the interstices between the wires are filled up by the water sealing part 51, and besides the tied wire bundle can be highly precisely finished into the desired outer diameter without the need for a time-consuming tape-winding operation regardless of whether or not the wire bundle includes the wires of different outer diameters, and the production process can be suitably automated, and the improved productivity and the enhanced waterproof performance can be achieved.

In this embodiment, the shaping of the grommet-passing portion of the wire bundle is effected by the press-shaping operation employing the lower mold 41 and the upper mold 43, and the shaping operation can be completed within a much shorter time as compared with the case where the shaping operation is effected by the tape-winding operation.

Therefore, as compared with the related-art method including the time-consuming tape-winding operation, two-pack foamed silicone RTV, which can be completely solidified in a short time, can be used as the water sealing agent, and with the use of such short-time-solidifying water sealing agent, the productivity can be further improved greatly.

In this embodiment, the wire bundle is shaped into the circular cross-sectional shape by the lower and upper molds 41 and 43 on the assumption that the harness-passing hole in the grommet has the circular cross-sectional shape. However, in the case of shaping the wire bundle by such molds, the wire bundle can be formed into a desired shape (e.g. a square shape) other than the circular cross-sectional shape by suitably forming molding surfaces of the molds, and a grommet, having a harness-passing hole of a shape other than a circular shape, can be selected, and by doing so, the degree of freedom of arrangement of the wire harness can be increased.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of manufacturing a waterproof wire harness, comprising the steps of:

providing a plurality of wires;

providing a coating position at which an water sealing agent in an unsolidified condition is coated on an outer periphery of each wire;

providing a first mold formed with a groove;

providing a second mold configured to be inserted into the groove, the second mold having a molding face which defines a space between a bottom portion of the groove, the space having a cross section which is identical with a cross sectional shape of a through hole of a grommet through which the wires are inserted;

conveying the wires separately and individually one by one so as to pass through the coating position while individually coating the outer periphery of each wire with a predetermined amount of the water sealing agent in an unsolidified condition, wherein the sealing agent is caused to drop onto each wire;

throwing the wires individually coated with the water sealing agent into the groove of the first mold, wherein the coated wires are thrown sequentially into the groove of the first mold;

inserting the second mold into the groove;

pressing the wires in the groove such that the unsolidified water sealing agent fills interstices of adjacent wires while solidifying the water sealing agent; and releasing the second mold from the first mold after the water sealing agent is solidified.

2. The manufacturing method as set forth in claim 1, wherein a two-pack foamed silicone RTV is used as the water sealing agent.

3. The manufacturing method as set forth in claim 1, wherein the plurality of wires are electric wires.

4. The manufacturing method as set forth in claim 2, wherein the plurality of wires are electric wires.

5. The manufacturing method as set forth in claim 1, wherein the sealing agent is caused to drop onto each wire passing through the coating position by a coating nozzle.

* * * * *